Nov. 28, 1950     E. S. PRINCE ET AL     2,531,989
MULTIPLE DRINK MIXING MACHINE
Filed Oct. 4, 1945     5 Sheets-Sheet 1
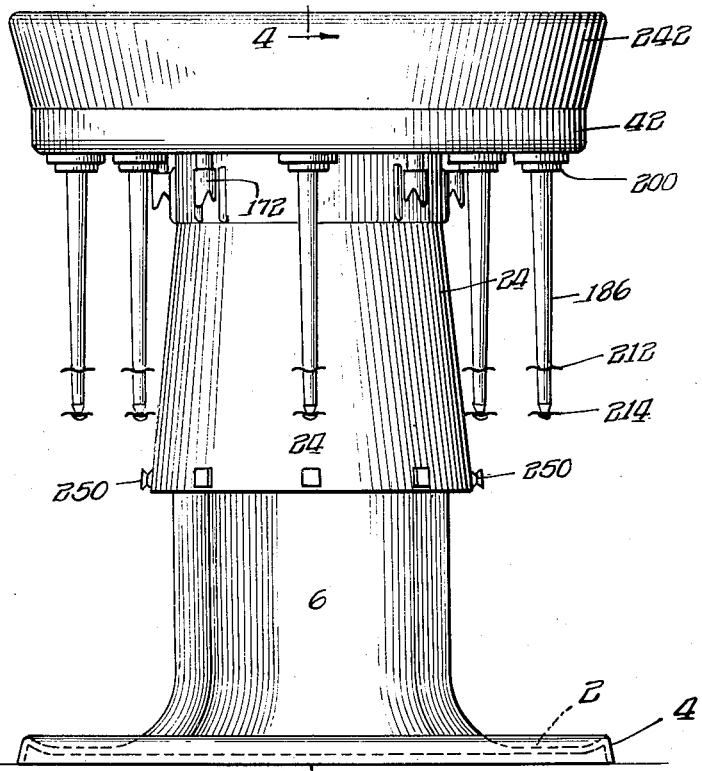
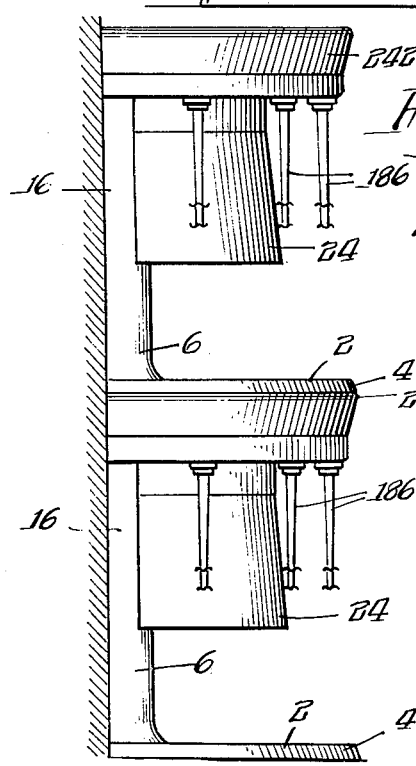
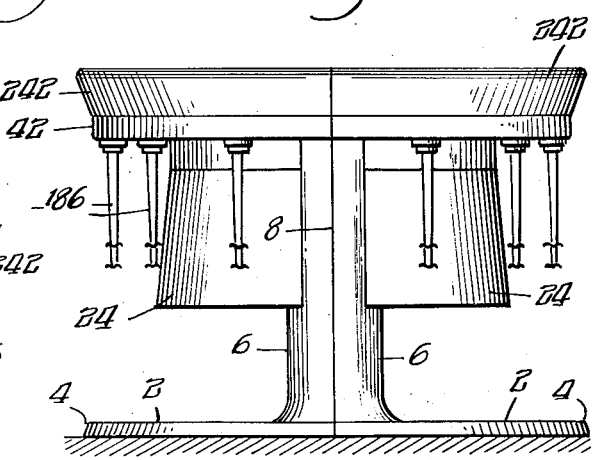
INVENTORS
Earl S. Prince
John Brotheridge
By: Moore, Olson & Trexler
attys.

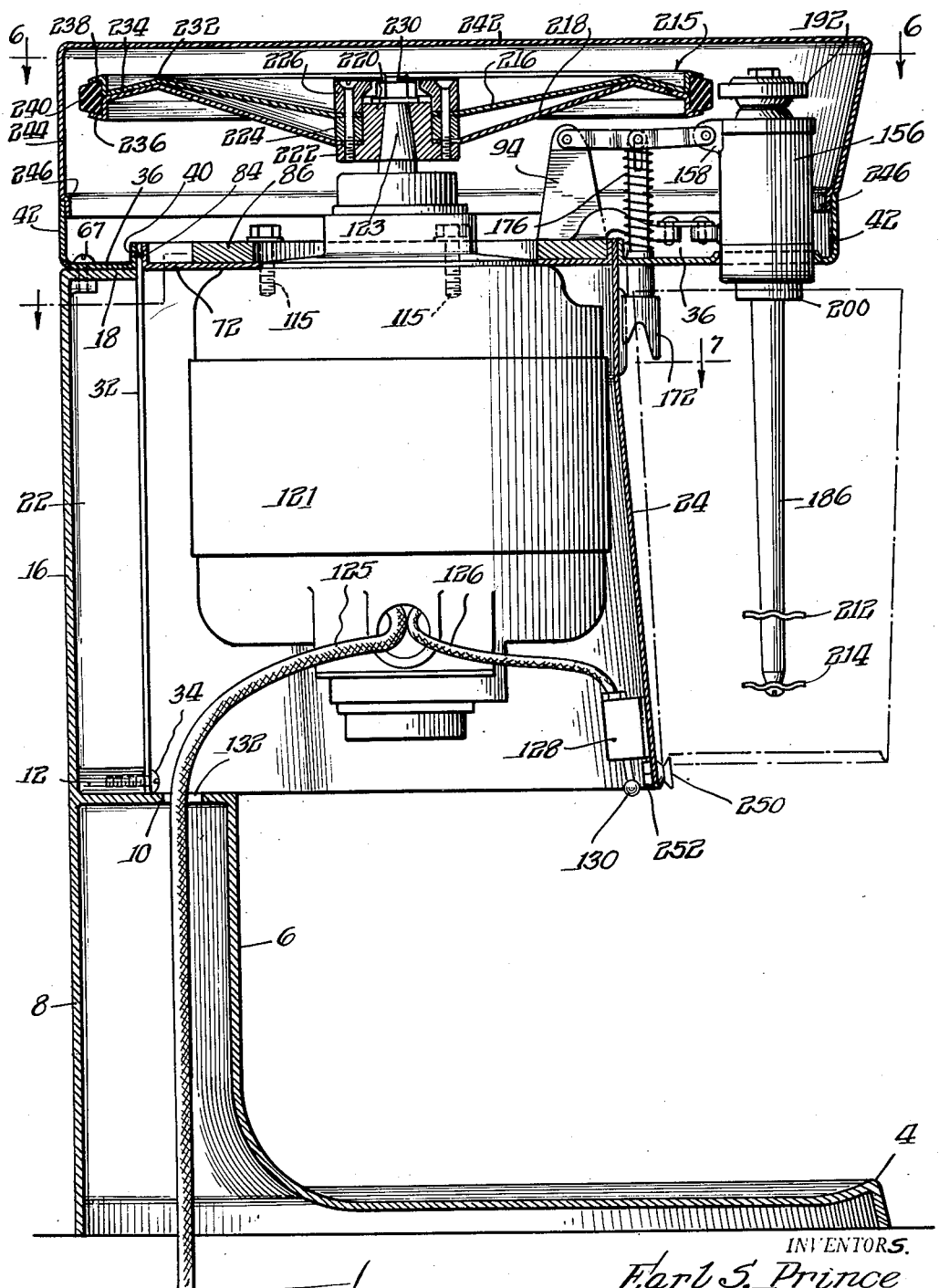

Nov. 28, 1950     E. S. PRINCE ET AL     2,531,989
MULTIPLE DRINK MIXING MACHINE

Filed Oct. 4, 1945     5 Sheets-Sheet 3

INVENTORS.
Earl S. Prince
John Brotheridge
By:— Moore, Olson & Tr
attys.

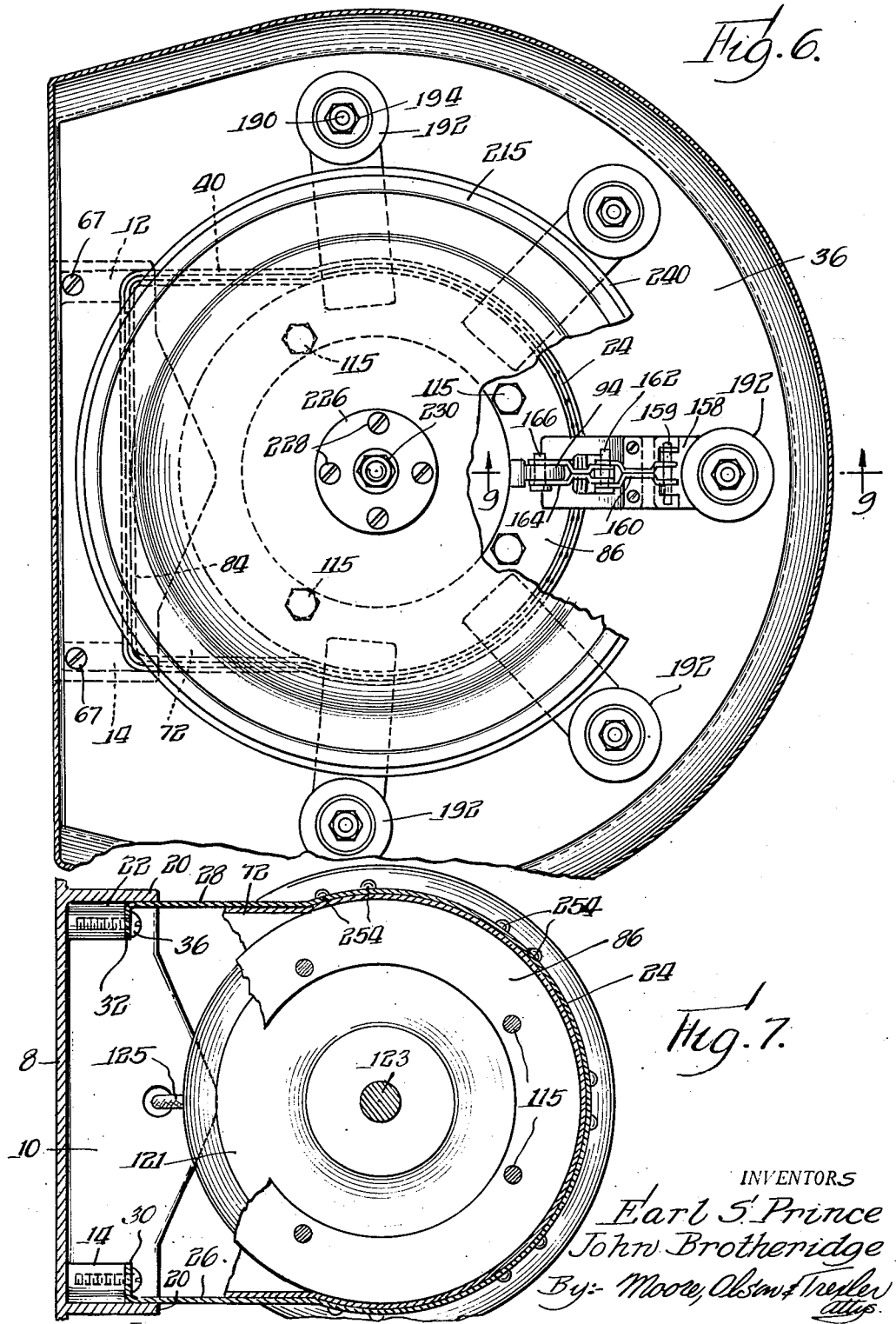

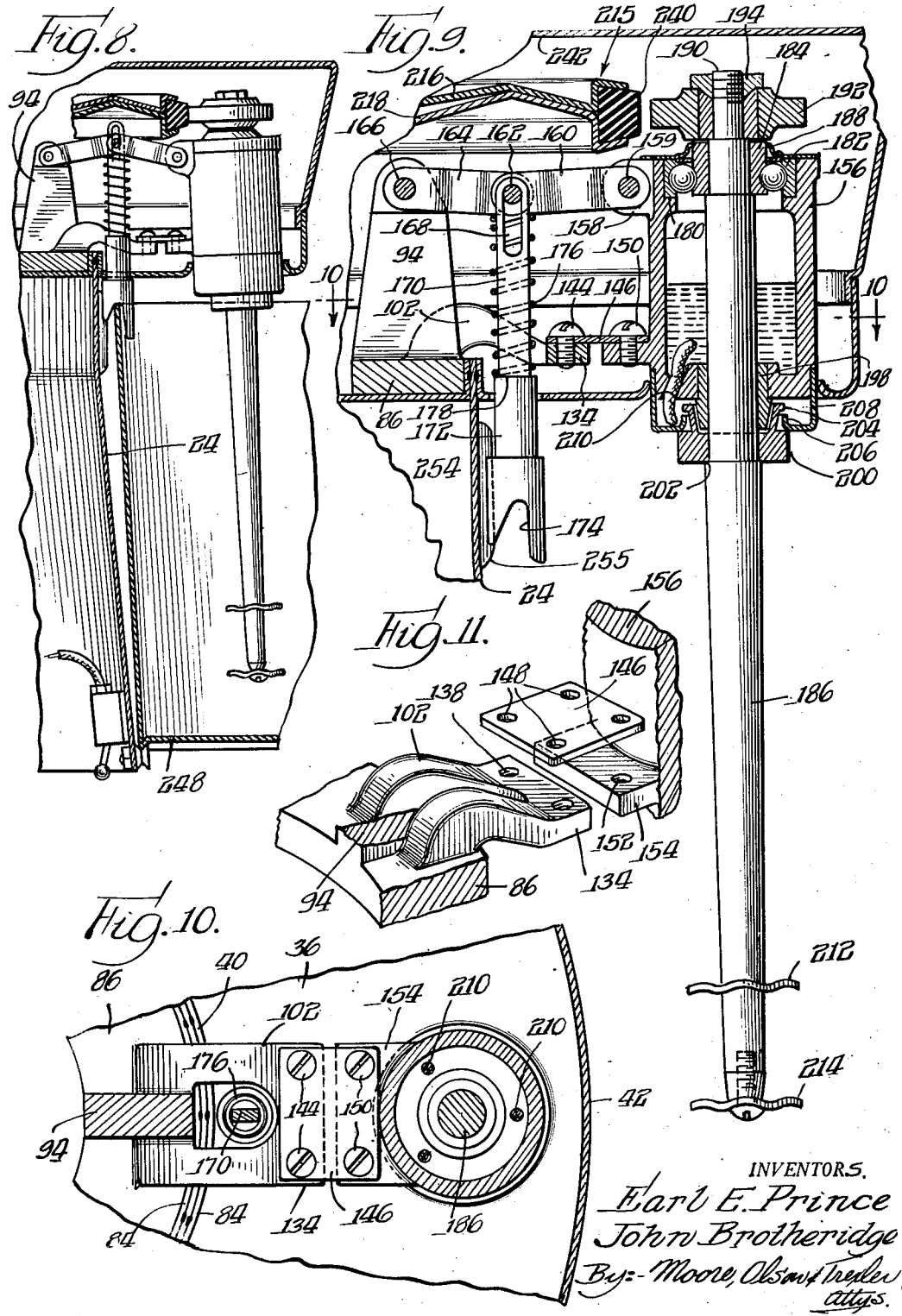

Patented Nov. 28, 1950

2,531,989

UNITED STATES PATENT OFFICE 2,531,989

MULTIPLE DRINK MIXING MACHINE

Earl S. Prince and John Brotheridge, Rock Falls, Ill., assignors to Prince Castle Manufacturing Division, Inc., Sterling, Ill., a corporation of Illinois Application October 4, 1945, Serial No. 620,304

10 Claims. (Cl. 259—131)

This invention relates to multiple drink mixing machines, and the object of the present invention is to provide a multiple drink mixing machine having a base having an upstanding column from the upper portion of which depend a plurality of spaced apart, rotatable drink mixing spindles, together with associated means on the column adapted to receive a plurality of cups into each of which a rotatable mixing spindle is adapted to depend, and when rotated, to mix the drink in the cup, and wherein the base of the machine is formed as a stationary tray to receive the cups when not in drink mixing position and wherein the tray is arranged to catch the dripping from any one of the spindles, thus ensuring cleanliness and more sanitary conditions, and wherein the mixer likewise has better stability because of the tray base and does not have to be held with the hand when the cups are put in position.

Another object of the invention is to provide a machine of the foregoing character which eliminates the necessity of supporting the mixer when the cups are positioned with the spindle depending thereinto and ready for mixing.

Another object of the present invention is to provide a multiple spindle drink mixer which eliminates the tendency of the upper part of the mixer carrying the rotatable mixing spindles to turn relatively to the base due to the starting torque of the motor when any of the individual spindles are rotated by mixing, whereby the location of any particular spindle and its associated mixing cup is maintained and thereby confusion is eliminated.

Another object of the invention is to provide a multiple drink mixing machine having a base and a column upstanding therefrom, which column supports the mixing head including a plurality of spaced apart, depending, rotatable mixing spindles, together with means for selectively driving them, and wherein the base is formed as a tray not only to catch any dripping and support the cups when not in mixing position, but also wherein the outer edge of the base acts as a guard for protecting the depending spindles during shipment and use.

Yet another object of the invention resides in providing a multiple drink mixing machine having a stationary base, preferably in the form of a tray from which at one end rises an upstanding column flat at the back and which column supports a depending head carrying a series of spaced apart, depending mixing spindles, there being means in the head for selectively driving the spindles from a power source, and by means of which arrangement the flat back surface of the upstanding column is adapted snugly to fit against a flat wall for compactness and support, or whereby two of the units may be placed with the flat portions of the columns back to back in compact relationship to provide a substantially circular battery of depending, spaced apart spindles and a pair of oppositely extending drip catching and cup receiving trays, or alternatively whereby the base of one unit may be superimposed upon the flat top surface of the head of another unit or upon an intervening support whereby to provide a superimposed pair of units, each lying with its flat back disposed against a common vertical wall surface and thereby providing a compact and convenient arrangement of two machines to give double the capacity of a single machine, but in a compactly arranged combination.

Still another object of the invention resides in providing a machine of the foregoing character wherein the upstanding column of its base is provided with a flat back surface whereby the machine may be stably placed upon its back for cleaning, handling and transporting, and wherein the edge of the base projects beyond the spindles to protect them from breakage.

Yet another object of the invention resides in providing a multiple drink mixing machine wherein the base is stationary and is preferably flat in the form of a tray, and wherein the base is provided with an upstanding column having a depending stationary head overhanging outwardly therefrom to overlie the base and supporting a plurality of spaced apart, rotatable spindles, the entire construction ensuring that all the separate rotatable mixing spindles are accessible for use and because the position of each spindle is stationary with respect to the base there is no orbital movement of the spindles and hence no confusion in relocating particular drinks corresponding to particular mixing spindles being used.

Yet another object of the invention resides in providing a multiple spindle drink mixing machine incorporating a base, an upstanding column and a head carried by the column which includes a driving motor and a relatively large driving wheel around the periphery of which are disposed a series of spaced apart smaller driven wheels mounted on individual mixing spindles depending from the head and wherein the driving wheel is provided with means providing a high traction peripheral drive for the individual spindle wheels, and likewise providing quiet operation, the elimination of work flat spots on the driven wheels, the too frequent replacement of individual driven wheels, and wherein the individual spindle rotation can be controlled at the point of disengagement by the weight and type of the driven wheel and so also whereby the replacement of the one larger driving wheel eliminates the necessity of replacing a plurality of individual driven wheels on the mixing spindles.

Yet another object of the invention resides in providing a mixing spindle construction including a single upper ball bearing to take the thrust of the mixing spindle, a lower sleeve bearing acting as a guiding means for the mixing spindle, the provision of a non-corrosive material associated with this lower bearing due to moisture from the liquid being mixed, the utilization of a heavier spindle shaft between the bearings, the provision of a so-called slinger wheel associated with the mixing spindle for returning the oil into the lubricating chamber of the bearing rather than having the oil leak down into the liquid being mixed in the cup, and by which construction, conversely, the liquid being mixed is kept out of the bearing.

Yet another object of the invention resides in the provision of a large motor-driven driving wheel for the separate spindles wherein the driving wheel is formed of sheet metal and is provided with a replaceable tire for engaging the relatively smaller driven wheels of the separate spindles.

Yet another object of the invention resides in providing a housing and support mechanism for the motor and the driving spindles, formed of sheet metal and arranged ruggedly to receive and support a spider casting having means thereon for radially supporting a plurality of mixing spindles adapted to be driven by a centrally disposed, motor-driven, larger friction wheel, all the parts being mounted in the dirt-proof sheet metal housing, and thereby promoting lightness of weight and sanitation in the entire structure.

Another object of the invention resides in providing a special type of spring mounting for the mixing spindle which serves to eliminate wear, reduces the number of parts, adds to the rigidity of the mixing spindles, and assists in causing the automatic disengagement of the spindle driven wheel from the main power-driven wheel when the cup is removed from receiving position.

Other and further objects of the inventtion will be apparent from the following specification when taken in connection with the accompanying drawing, wherein:

Figure 1 is a front view of an improved form of the multiple spindle drink mixing machine;

Figure 2 is an arrangement showing the utilization of two of the units in vertically disposed position;

Figure 3 is a view showing two of the units arranged in back to back position;

Figure 4 is a vertical section on the line 4—4 of Figure 1;

Figure 5:
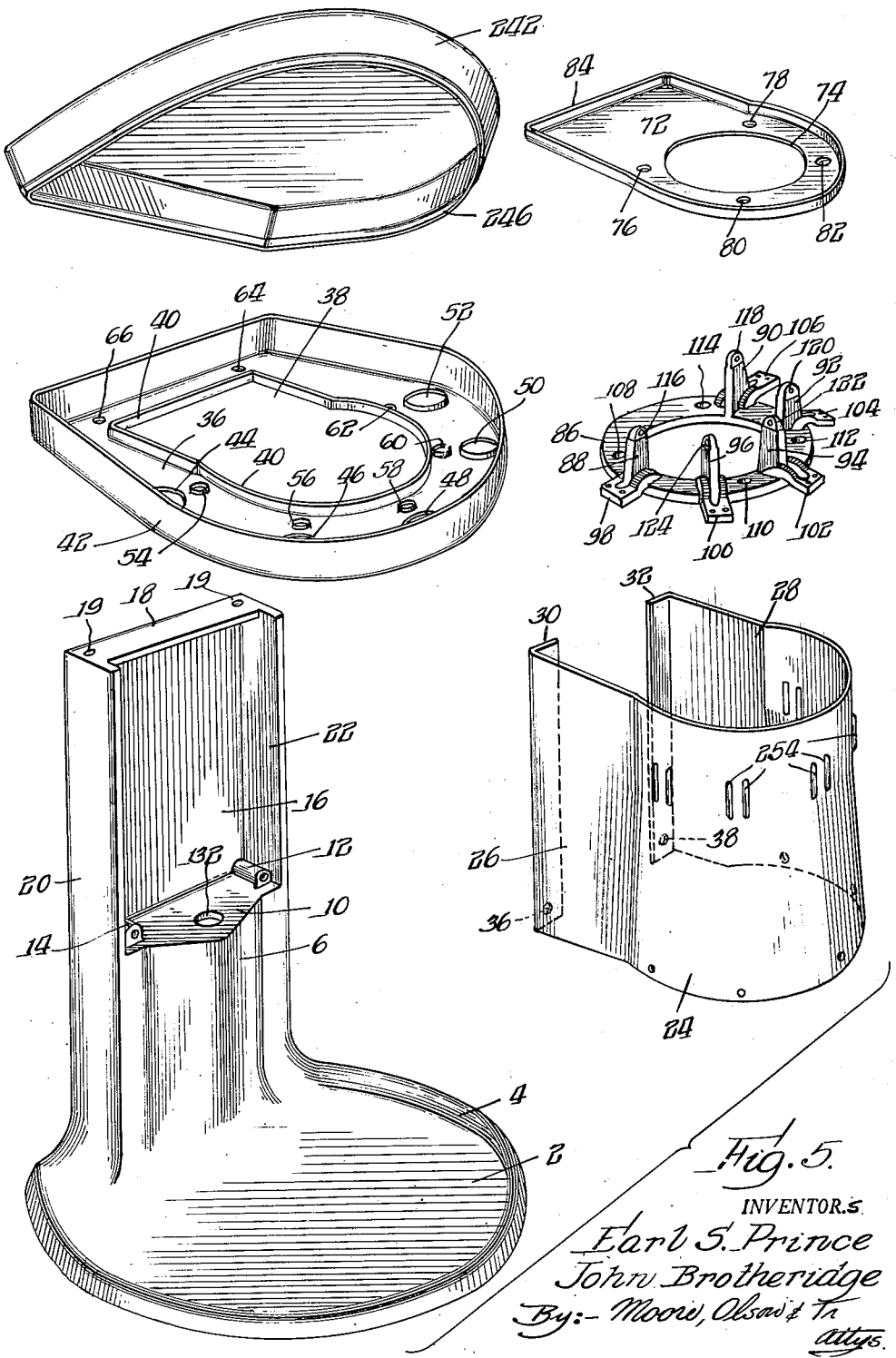

Figure 5 comprises a collection of perspective views of the various parts of the housing construction and spider of the device;

Figure 6 is a plan section taken on the line 6—6 of Figure 4;

Figure 7 is a plan section on the line 7—7 of Figure 4;

Figure 8 is a view showing the mixing cup in driving position;

Figure 9 is a vertical section taken on the line 9—9 of Figure 6;

Figure 10 is a plan section taken on the line 10—10 of Figure 9; and

Figure 11 is a perspective view of the spring mounting.

Referring now to the drawings in detail, the machine in general comprises a flat stationary base 2. As shown in Figure 5, this base 2 is generally circular although it may be substantially rectangular, and is provided with a depressed portion and a surrounding upstanding rim 4 providing a shallow tray. By reference to Figure 4 it will be noticed that the rim 4 of the tray projects outwardly beyond the vertical longitudinal axis of the center mixing spindle, whereby the drip from the mixing spindle will be caught by the tray.

This tray is a casting of suitable metal and is formed at its rear with a preferably integral vertical, hollow, upstanding column providing a front wall 6 and a flat rear wall 8. About midway of its height the front and rear walls are connected by a transverse, horizontal, integral wall 10 forming a horizontal support for the mixing head and housing. This wall 10 is provided with two horizontally disposed, spaced, threadedly bored lugs 12 and 14 at opposite sides thereof, as shown in Figure 5, and which lugs are set back a slight distance from the front wall 6 of the bottom portion of the column. Above the transverse wall 10 the column continues upwardly as at 16 and terminates in an inwardly extending horizontal flange 18. The column is provided with the upstanding side walls 20 and 22 and from the transverse wall 10 upwardly to the transverse upper wall 18 is open at the front, and is closed by the bottom front wall 6.

A mixing head is supported from this column. The head includes a motor housing comprising a preferably sleeve-like portion 24 of sheet metal and a pair of spaced, rearwardly depending flanges 30 and 32 adapted to be fastened in position on the transverse horizontal wall 10 and within the side walls 20 and 22 and the top wall 18. In addition there is provided a top horizontal plate 36 having a central opening 38 and an upstanding peripheral flange 40 around the opening. The plate 36 is provided with a peripheral upstanding larger flange 42 and a series of spindle holes 44, 46, 48, 50 and 52 and a series of smaller holes 54, 56, 58, 60 and 62. In addition the rear portion of the plate 40 is provided with the two holes 64 and 66.

A sheet metal motor plate 72 is provided with a relatively large aperture 74 at one end and four holes 76, 78, 80 and 82. In addition, the motor plate is provided with an upstanding integral rim 84. This rim is adapted to seat in the upstanding flange 40 of the top plate. The motor plate is adapted to carry a spider comprising an integral metal casting which comprises a circular rim 86 provided with five upstanding posts 88, 90, 92, 94 and 96. These posts are spaced equidistantly around the forward arcuate portion of the rim 86 and in addition each post includes an outstanding radially projecting tongue or lug 98, 100, 102, 104, and 106. The rim 86 is likewise provided with a series of holes 108, 110, 112 and 114 which holes register with the holes 76, 78, 80 and 82 of the motor plate. Each upstanding post is in turn provided with a horizontally extending hole 116, 118, 120, 122 and 124, hereinafter described. As shown clearly in Figure 4, the flanges 84 of the motor plate, and the vertical flanges 30 and 32 and the flange 40 of the top plate, are positioned in contacting relation and are welded together. The top plate is bolted as at 67 through the holes 64 and 66 of the top plate into threaded holes 19 in the upper transverse horizontal partition 18 of the base whereby in conjunction with the fact that the bottom portions of the flanges 30 and 32 are bolted as at 36 and 38 into the threaded lugs 12 and 14 of the bottom horizontal flange 10 of the base, means is provided for effectively and rigidly supporting the top plate, the motor plate, the spider and motor housing, from the base. The same bolts 115 that attach the spider 86 to the motor plate 72 likewise pass into the top portion of the motor and affix it rigidly to the motor plate and spider whereby the motor 121 is mounted in the head with the motor spindle 123 upstanding therefrom. The bottom of the motor is provided with electrical conduits 125 and 126, the latter connecting with a switch 128 having a control member 130 which projects beyond the lower end of the skirt portion 24 of the housing. The electrical cord 125 passes downwardly through an opening 132 in the flange 10 of the base and thence downwardly through the column between the front and back portions 6 and 8 respectively, and thence out through the open bottom of the column for connection to a source of current.

As shown clearly in Figure 11, the outwardly extending tongue 102 of the spider is provided with a flat portion 134 and is provided with a pair of fastener openings 138 adapted to have fastened thereto by means of bolts 144 a tempered flat spring metal piece 146 which in turn is provided with holes 148. Screws 150 pass through this plate and thread into holes 152 formed in a laterally projecting lug 154 of a circular bearing housing 156 whereby the bearing housing is resiliently mounted on the spider by means of the spring plate 146. The bearing housing is adapted to project through any one of the openings 44, 46, 48, 50 and 52 of the top plate. Each of these holes is shown as provided with an inturned, relatively resilient annular flange which more or less resiliently and snugly fits around the lower portion of a bearing sleeve carried by the housing 156 and hereinafter described. The bearing housing at its upper end includes a pair of perforated ears 158 through which, by means of a pin 159, is pivotally connected a link 160 perforated at its outer end to receive a pin 162 which pivotally connects the link 160 with another link 164 in turn pivoted as at 166 in the hole of one of the uprights or standards 94 carried by the spider 86. The two links 160 and 164 together with the three pivots 166, 159, and 162 form a toggle joint link. Passing over the pin 162 is the slotted portion 168 of an extension 170 of a plunger 172. This plunger is provided on its bottom portion with a peculiarly formed slot 174 conformed to receive the rim of a cup in the manner shown substantially in the Brotheridge Patent 2,218,808 of October 22, 1940. In addition, surrounding the upper portion of the plunger 172 is a coil spring 176 which has its bottom end contacting against a shoulder 178 on the plunger portion and has its top portion pressing against the underside of the two links 160 and 164 about the pin 162. The function of the spring is normally to force the plunger 172 downwardly to a point where the pivot 162 is slightly below the horizontal level of the two centers of the pivots 159 and 166 whereby the toggle is in a position which tends to keep it as shown in Figure 9. However, upon raising of the plunger 172 by the insertion of the upper edge of the rim of the cup in the slot 174, the plunger 172 is moved upwardly, compressing the spring 176 and forcing the links 160 and 164 of the toggle upwardly. Since the pivot point 166 is fixed, the other pivot 159 will be pulled inwardly toward the pivot 166 which will thus pull the bearing housing 156 inwardly.

The upper end of the bearing housing is provided with a flange seat 180 to receive a ball bearing 182 to take the thrust of the mixing spindle 186 against the large driving wheel. A guard 188 closes the opening about the bearing 184. The upper end of the mixing spindle 186 is threaded as at 190 and carries a preferably metal friction roller 192. A cap 194 is threaded on the spindle 186 to hold the roller 192 in place. The central portion of the bearing housing 156 is formed as a lubricant reservoir. The bottom portion of this housing is closed by a hard Babbitt or bronze bearing 198 and in addition there is a slinger means 200 which is pressed onto the spindle and against the shoulder portion 202 of the spindle 186. This slinger means includes an upstanding circular, outwardly extending flange 204, the outer end of which overlies an inwardly and upwardly projecting flange 206 on a sleeve-like closure 208 attached to the bottom of the bearing and passing snugly through one of the openings such as 50 in the top plate. This slinger means 200 acts as a device for keeping the drink out of the bearing as the slinger rotates at high speed, and by centrifugal force will prevent the drink from entering the bearing 198 while the spindle is in motion. This sleeve-like closure 206 in effect forms an oil trough. There is a wick 210 which passes through an opening 212 in the bottom of the tubular bearing housing 156 and extends downwardly into this sleeve-like portion 206, the action being such that any excess oil escaping past the bearing will collect in the trough 206 and by capillary attraction will be conducted back up into the oil reservoir 210. The bottom of the spindle is provided with the usual type of mixing devices 212 and 214 affixed in any desired manner and any desired configuration thereon and thereinto. It will be noted that there are preferably five of these mixing spindles projecting downwardly through the bottom of the housing and that they are equally spaced in a half circle and extend radially of the central motor spindle 123. It will be understood each one of the mixing spindles 186 has on its upper end a metal driving wheel 192.

It will thus be seen that the sleeve-like closure 208 attached to the bottom of the bearing housing 156 of each mixing spindle 186, passes snugly through one of the holes 44 to 52 inclusive of the top plate, and since this top plate 36 is formed of sheet metal and the peripheral edges of these holes are slightly rounded or bent upwardly as shown in Figure 9, a certain resiliency is imparted to the edges of these holes through which the cylindrical sleeve-like closure 208 snugly passes. This construction, in combination with the resilient mounting of the lug 154 of the bearing housing on the leaf spring 146, provides for a combination of bodily lateral movement and pivotal movement of the upper portion of the bearing housing 56 relatively to the rim 240 of the master driving wheel whereby when the cup is inserted in the socket 174 and an upward push is imparted to the cup, the toggle link mechanism will be moved to the position shown in Figure 8, against the tension of the spring 146 and also the spring 176, to move the driven pinion 192 into driving contact with the periphery 240 of the master wheel. This construction thereby provides a dust-tight means for mounting each bearing housing within the mixing head, while permitting a shifting of the pinion carried by the bearing housing into and out of contact with the master driving wheel, and this is accomplished without having to form the holes 48 to 52 extra large, since there is no undue lateral movement of the bearing housing and the sealing sleeve 208 with respect to the sheet metal housing portion 42 of the mixing head.

The central motor spindle 123 has affixed thereto a relatively larger, centrally disposed driving wheel 215 which in the present instance is preferably formed of sheet metal. This driving wheel 215 is comprised of an upper sheet metal disc 216 and a lower sheet metal disc 218. These two discs are secured to the spindle by means of a central circular block 220 having an outstanding lower flange 222 provided with suitable threaded perforations. In addition there is a spacing ring 224 likewise having perforations, and an upper, ring-like cap 226. A series of bolts or screws 228 pass through registering openings in the spacing ring 224 and into the threaded flange 222 of the block 220. The inner circular edges of the two discs 216 and 218 are received between the upper edges of the flange 222, the lower edges of the spacing ring 224 and the upper edge of the spacing ring 224 and the top cap 226, whereby the two disc-like portions are thoroughly clamped rotatably to the motor spindle. The upper portion of the motor spindle is threaded and is adapted to receive a wheel puller nut 230 which passes through an opening in the upper ring-like cap 226. The nut 230 has a cap over it and it acts as a wheel puller nut when it is turned off the spindle. It pulls the large driving wheel off the tapered spindle. The two discs 216 and 218 are shaped to converge in the manner shown in Figure 4. They extend slightly upwardly and meet at an annular locus 232 from which location they extend in parallelism and in juxtaposed, overlapping relation as at 234. The portions in contact as at 234 are welded together whereby to form an integral, rugged driving disc. Each disc is provided with one half portion of a rim receptacle such as 236 and 238, which is adapted to receive a rubber tire or rim 240 which may be removed for replacement or repair.

A sheet metal closure 242 having a depending circular flange 244 extends over the top of the housing and carries an inwardly extending lip 246 which lies within the upstanding rim 42 of the top plate whereby to form a dust-proof casing for the top of the housing. The top of this upper casing 242 is flat. From an inspection of Figures 2 and 3 it will be noted that by reason of the flat construction of the top two of these units may be superimposed for a vertical tier arrangement with the flat backs of the columns of each unit flatly against the vertical side wall, or alternatively, the two units may be disposed back to back, as shown in Figure 3, to provide a substantially continuous double machine. In some instances, in the back to back arrangement shown in Figure 3, the upright columns may be provided with outstanding lugs whereby the two columns may be bolted, fastened or latched together to form a compact unit as shown in Figure 3. Alternatively, four mixers may be placed in a group.

In any event, it will be noted by reason of the fact that the tray 2 is stationary and that the depending spindles do not move orbitally with respect to the base, a very convenient arrangement is provided whereby when a drink is put under any particular spindle and moved upwardly into the position so that the bottom of the cup 248 is caught by the lip 250 of the support stud 252 carried by the bottom of the skirt portion of the housing, the cup will be disengageably held in position with the spindle 186 projecting downwardly thereinto. Hence this cup will remain in this particular location so that an operator will always be able to locate and distinguish that particular cup from any other cup. By this means the location of a cup once put into the machine is definitely fixed at all times until removed. The pairs of vertically elongated ribs 254 are formed in spaced apart relation upon the sheet metal housing 24 just opposite each one of the mixing spindles and relatively close to the position of the depending plungers 174. The lower ends of these ribs, as shown in Figure 9, are tapered as shown at 255 so that as the cup is pushed upwardly the upper lip of the cup will strike this tapered surface 255 and guide the upper lip of the cup into the slot 174 of the plunger 172. Therefore these ribs also act to guide the edge of the cup into the cup holder and to guide the cup into position for mixing. The spacing between the ribs forms a vertical track for the periphery of the cup so that the operator can correspondingly position the cup by the feel of the edge of the cup against the two ribs.

In connection with the operation of the device, the insertion of the cup, as hereinbefore described, raises the plunger, thereby causing the bearing housing to be moved inwardly against the tension plate 146 and against the tension of the spring 176 so as to cause a roller 192 of a particular spindle to engage the rubber tire 240 of the circular driving wheel whereby that particular spindle is directly rotated at a relatively high rate of speed. Each particular spindle is thus capable of being selectively controlled by engaging or disengaging its driving wheel from the constantly rotating central driving wheel formed by the discs 216 and 218 and the tire 240. When the cup is released and moved downwardly the spring mounting plate 146, which has been put under tension, will straighten out and carry the smaller driving roller 192 out of contact with the rotating central driving wheel 40, whereby to assist the spring 176 in this purpose, and this spring 176 of the plunger then carries the central pivot pin 162 downwardly below the level of the pivots 166 and 159 whereby to lock the small roller out of driving engagement so that it cannot be inadvertently thrown into engagement unless another cup is inserted into mixing position.

Obviously the invention is not limited to the specific details of construction disclosed herein but is capable of other modifications and changes without departing from the spirit and scope of the appended claims.

Having thus described our invention, what we claim as new and desire to secure by Letters Patent is:

1. A multiple spindle drink mixing machine comprising a base including a relatively flat horizontal tray and an upstanding column, said column having upper and lower spaced apart horizontally extending flanges, a top plate having a central aperture and a marginal upstanding flange and a plurality of spaced apart spindle openings, the opening of the top plate having an upstanding flange, a motor plate having an upstanding flange adapted snugly to fit in the upstanding flange of the top plate, said motor plate having an opening registering with the opening in the top plate, a spider having a circular rim portion and a plurality of radially extending, spaced apart, upstanding brackets and outstanding tongues or lugs, means for securing the spider on the motor plate, a motor mounted on the spider with the shaft of the motor projecting upwardly through the opening in the spider and through the opening in the motor plate, and a housing surrounding the motor, a relatively large driving gear mounted on the upper portion of said motor shaft and a plurality of mixing spindles mounted in said top plate, means forming a toggle joint connection between the upper portions of the upstanding supports on said spider and each of said mixing spindles, a plunger mechanism connected to the central portion of said toggle joint and including a plunger depending downwardly through said top plate, a spring for urging said plunger downwardly to hold said toggle in extended position, a plurality of cup rests mounted on the bottom of said housing, a plurality of relatively smaller driven pinions one mounted on each upper end of said mixing spindles, a spring mounting comprising a leaf spring rigidly connected to the outer end of each rearwardly extending lug on the spider and connected to a spindle whereby resiliently to mount each of the wheels on said spindles normally out of engagement with said central driving wheel and whereby upon operation of said toggle mechanism said small wheels will be thrown into and out of engagement with said main driving wheel.

2. A spider casting for a multiple drink mixing machine comprising a one piece metal casting comprising a flat ring having integral, upstanding, spaced apart standards projecting upwardly therefrom, said ring at the base of each standard having an outwardly extending tongue, the central portion of which curves upwardly and thence downwardly on opposite sides of and outwardly of said upstanding standards or brackets, the plane of the undersurface of each tongue being substantially adjacent the plane of the upper surface of the ring.

3. A spider casting for a multiple drink mixing machine comprising a one piece metal casting comprising a flat ring having integral, upstanding, spaced apart standards projecting upwardly therefrom and adjacent, outwardly extending tongues, the central portions of which curve upwardly and thence downwardly on opposite sides of and outwardly of said upstanding standards or brackets, and a flat piece of spring metal secured to the outer ends of each of said tongues, a support for said rim, a motor mounted on said support and ring, a mixing spindle including a bearing housing at its upper end, said bearing housing having means mounted on the outer end of said spring plate, said mixing spindle carrying a driven pinion, and a master drive pinion mounted on said motor shaft and means for shifting said bearing housing laterally into contact with said master drive wheel whereby upon release of said means said spring means will shift said spindle pinion out of contact with said master driving wheel.

4. In a multiple spindle drink mixing machine, the combination of a base having an upstanding column, a sheet metal housing mounted on said column of said base and extending laterally from the column and overlying said base, an apertured top plate of sheet metal having a central opening, a motor plate of sheet metal mounted in said opening, said motor plate and top plate and housing having interengaging flanges, and means for fastening said interengaging flanges to said upstanding column whereby rigidly to mount the same on said column, a spider casting mounted on said motor plate, said casting having an opening registering with the opening in said motor plate, the opening of said motor plate registering with the opening in said top plate, a motor mounted on said motor plate with the drive shaft of the motor projecting therethrough and with the motor depending therefrom, standards radially mounted on said spider about the central axis of said motor, a spring mounted on each standard and a plurality of mixing spindles each having a bearing housing on its upper end through which the mixing spindles pass and in which they are rotatable, each bearing housing being mounted upon one of said spring plates, a master drive wheel mounted on the motor shaft and a pinion mounted on each mixing spindle, and means interconnecting a bearing housing on each spindle with a standard on the spider for selectively shifting the driven pinion on the mixing spindle with said motor driven master wheel.

5. A multiple spindle drink mixer comprising a relatively flat, shallow basal tray having along one edge at the central portion thereof an upstanding rigid column, a mixing head mounted at the upper portion of said column, said mixing head including a centrally disposed cylindrical depending housing, the lower portion of which overlies the central portion of a relatively large zone of the base, the mixing head extending outwardly horizontally beyond the central housing and overlying all parts thereof, a motor mounted in said housing and having a vertical shaft, a driving wheel on the upper end of said shaft, said wheel being disposed within said mixing head, said mixing head having a bottom provided with a plurality of circular spaced apart openings in that part of the mixing head which projects beyond the housing, a plurality of mixing spindles, each mixing spindle having a bearing housing, there being a bearing housing projecting through each one of said openings in said overlying projecting bottom portion of said mixing head, a driven pinion mounted on the upper end of each said mixing head, spring means mounted in said mixing head and connected to the bearing housing of each spindle for resiliently and normally maintaining the driven pinion of each mixing spindle out of driving engagement with the mixing head, and toggle mechanism connected to said bearing housing and to a support within said mixing head and including a depending actuator depending outwardly through an opening in the bottom of said mixing head and positioned adjacent the upper wall of said cylindrical housing, and means on said cylindrical housing for guiding and supporting a cup thereon with the edge of the cup when so positioned adapted to contact the toggle actuating means for shifting the driven pinion on the upper end of a selected mixing spindle into driving contact with the driving wheel on the motor shaft.

6. A spider casting for a multiple drink mixing machine comprising a one piece metal casting comprising a flat ring having integral, upstanding, spaced apart standards projecting therefrom, said ring at the base of each standard having an outwardly extending tongue projecting substantially beyond the outer periphery of the ring, the bottom face of the tongue being disposed above the plane of the bottom face of the ring.

7. A multiple spindle drink mixer comprising a relatively shallow base of substantial area, said base at one side centrally thereof having an upstanding, relatively tall column, the cross sectional area of said column being relatively small compared to the cross sectional area of the base, said upstanding column having a rear face that is substantially flat and the vertical plane of which lies substantially flush with the rear edge of said base, said column at a substantial distance thereof spaced from the base having a cylindrical housing extending outwardly from the front face of said column and overlying the central portion of the base in spaced relation therefrom, a motor mounted in said housing and having a central shaft extending vertically substantially centrally of the housing, a mixing head mounted on the top of the column and extending outwardly at right angles to said column and beyond the vertical side walls of said cylindrical housing to close the top of the housing and overlying the outer substantially vertical wall of the housing, a relatively large driving wheel mounted on the upper end of the motor shaft within said mixing housing, and a plurality of spindles mounted within said mixing head, said spindles depending in spaced relation around that portion of the mixing head outstanding from the housing and spaced concentrally about the driving wheel, said spindles at their bottom portions carrying drink mixing means, means in said mixing head for shiftably mounting the upper ends of said spindles, and means on the upper end of each spindle for rotating it from the relatively large central driving pulley, the outer wall of said cylindrical housing having spaced cup supporting means thereon and mechanism actuated by the act of placing the cup in supported position on said housing for shifting the upper end of any one of said spindles into driving relation with the central driving pulley.

8. A multiple spindle drink mixer comprising a relatively shallow base of substantial area, said base at one side centrally thereof having an upstanding, relatively tall column, the cross sectional area of said column being relatively small compared to the cross sectional area of the base, said upstanding column having a rear face that is substantially flush with the rear edge of said base, said column having a cylindrical housing extending outwardly from the front face of said column and overlying the central portion of the base in spaced relation therefrom, a motor mounted in said housing and having a central shaft extending vertically centrally of the housing, a mixing head mounted on the top of the column and extending outwardly at right angles to said column and beyond the vertical side walls of and closing the top of said cylindrical housing, said head overlying the outer portions of the base that lie beyond the vertical projections of the peripheral walls of the housing, a relatively large driving wheel mounted on the upper end of the motor shaft within said mixing head, and a plurality of depending spindles having upper bearings movably mounted within said mixing head outstanding from and above the housing and spaced concentrically about the motor driving wheel, said spindles at their bottom portions carrying drink mixing means, means in said mixing head for so shiftably mounting said spindles and a relatively small driven wheel on the upper end of each spindle for drivingly connecting it to the relatively large central driving wheel, the outer wall of said cylindrical housing having spaced cup supporting means thereon and mechanism mounted in the mixing head and actuated by the act of placing the cup in supported position on said housing for drivingly interconnecting the driven wheel on the upper end of one of said spindles with the central driving wheel, the top portion of said mixing head being substantially flat whereby the base of an additional unit may be mounted on the upper flat surface of said driving head with the flat wall of said second device flush with the flat back wall of the column of the first device.

9. A drink mixer comprising a base, a column upstanding therefrom, a prime mover supported by the column, a driving gear rotated by the prime mover, a mixing head disposed above the motor to enclose the driving wheel, a depending mixing spindle having its upper end carrying a driven pinion adapted to be rotated by contact with the driving wheel, a bearing housing for rotatably supporting the upper end of the mixing spindle, spring means for resiliently mounting the bearing head on the mixing head, said spring means normally maintaining the driven pinion of the mixing spindle out of contact with the driving wheel, and a toggle mechanism including an actuating member depending downwardly below the mixing head and having a lower end actuatable upon the positioning of a cup in mixing position with the spindle projecting into the cup, and spring means for actuating said toggle actuating member, said spring means being arranged normally to lock the driven pinion on the end of the mixing spindle out of driving engagement.

10. In a drink mixer, the combination of a base, a prime mover mounted thereon, a mixing head mounted on the base, a driving wheel in said mixing head, a mixing stem having a bearing housing disposed in said mixing head with the stem depending therebelow in spaced relation to said base and with the upper portion of the stem provided with a driven pinion adapted to engage the driving wheel, a bracket in said mixing head, and spring means mounted on said bracket and connected to said bearing housing for normally shifting said bearing housing to carry the driven pinion out of contact with the driving wheel, and means for shifting said bearing housing against the tension of said spring means to position said wheel into contact with said driving wheel, said last means including an additional spring acting normally to lock said bearing housing, said mixing stem and its driven pinion normally out of contact with said driven wheel.

EARL S. PRINCE.
JOHN BROTHERIDGE.

REFERENCES CITED

The following references are of record in the file of this patent:

UNITED STATES PATENTS

| Number | Name | Date |
|---|---|---|
| 1,399,080 | Ross | Dec. 6, 1921 |
| 1,720,355 | Scott | July 9, 1929 |
| 1,813,502 | Madsen | July 7, 1931 |
| 2,218,808 | Brotheridge | Oct. 22, 1940 |
| 2,375,038 | Regan | May 1, 1945 |